C. G. SLOPE.
TEAPOT.
APPLICATION FILED MAY 22, 1909.
950,732.
Patented Mar. 1, 1910.
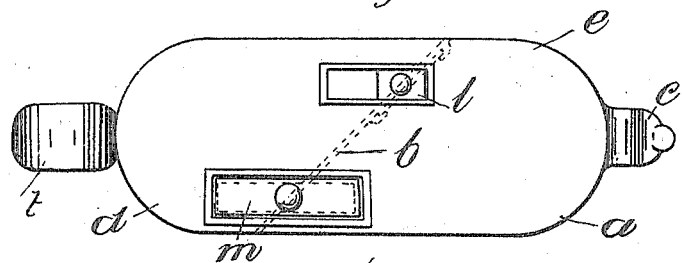
Fig. 1.
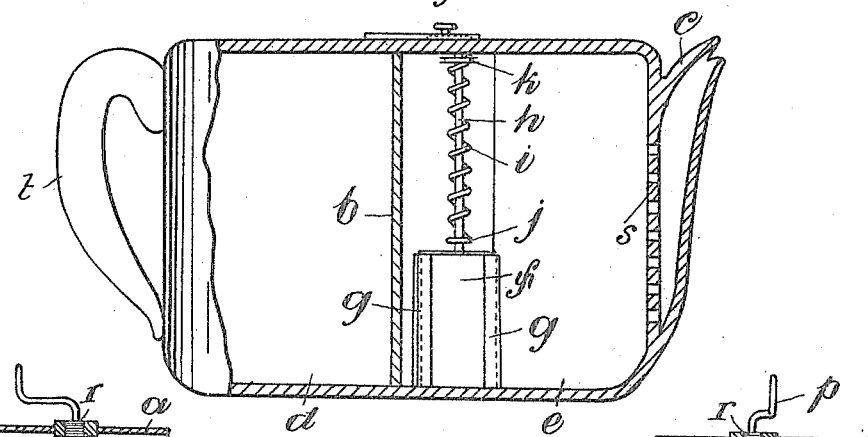
Fig. 2.
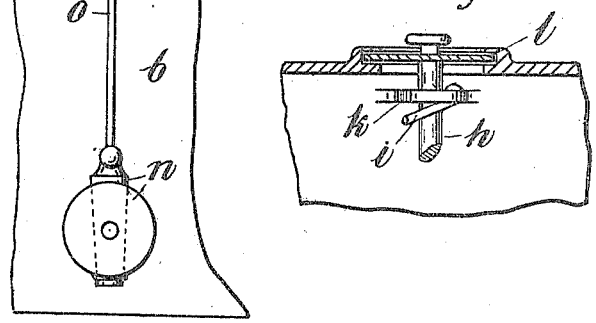
Fig. 3.
Fig. 4.
Fig. 5.
Witnesses:
W. Allen
W. E. Allen
Inventor.
Charles G. Slope,
by Herbert W. Kriner
Attorney.

UNITED STATES PATENT OFFICE.

CHARLES GEORGE SLOPE, OF FOREST GATE, ENGLAND.

TEAPOT.

950,732. Specification of Letters Patent. Patented Mar. 1, 1910.

Application filed May 22, 1909. Serial No. 497,669.

*To all whom it may concern:*

Be it known that I, CHARLES GEORGE SLOPE, dining-room keeper, residing at 23 Warwick road, Romford Road, Forest Gate, Essex, England, have invented certain new and useful Improvements in Teapots; and I do hereby declare the following to be a full, clear, and exact description of the invention, such as will enable others skilled in the art to which it appertains to make and use the same.

This invention relates to improvements in tea-pots, the object being to provide and arrange for the simultaneous brewing of two portions of tea in one and the same pot and in such a manner that when one portion has been consumed, the second portion may then be used while a short close set spout is further provided, enabling a large strainer or filtering surface to be employed. To this end, the pot is divided, preferably by a diagonal partition into two compartments, access being had to each by means of a common lid, while an opening is formed in the said partition normally closed by a valve or sliding gate or the like so that when the tea in the front compartment has been consumed, by opening the aforesaid gate, valve or the like, the tea in the second compartment may pass therefrom, through the first compartment and out by the spout in the usual way.

In order that this invention may be more fully understood, it will now be described with reference to the accompanying drawings, in which:—

Figure 1 is a plan of a tea-pot according to this invention. Fig. 2 is a partial longitudinal section thereof, and Fig. 3 is an enlarged detailed sectional view. Figs. 4 and 5 show in front and side elevation respectively, a modification hereinafter described.

As shown in the drawings and referring particularly to Figs. 1 to 3, the tea-pot $a$ is divided by a transverse partition $b$ into two compartments $d$ $e$. In the partition $b$ an opening is formed, normally closed by means of the gate $f$ working up and down in the side guides $g$, while attached to one end to the said gate is a vertical sliding rod $h$ having a spiral spring $i$ arranged around the same, secured at one end to the collar $j$ on the rod $h$ and at the other end to the fixed lug $k$ carried by the partition, said spring tending to raise the rod and gate $h$ and $f$. The rod and gate are normally retained in the "down" or closed position by the sliding plate or catch $l$ passing over the upper extremity of the said rod, the latter further passing through an opening formed in the top of the said pot.

A common lid $m$ allows access to be had to both compartments of the pot while the spout $c$ is of such a shape as to provide for a large straining surface $s$.

A single spout $c$ is provided, and is arranged at one end of the tea-pot, and a single handle $t$ is arranged at the other end of the tea-pot. The partition $b$ is arranged at the middle part of the tea-pot intermediate of its handle and pouring spout.

In practice, tea is made in both compartments of the pot simultaneously that from the front compartment being first utilized when the gate is allowed to open under the influence of the spring $i$ when the sliding catch $l$ is drawn back and the tea brewed in the rear compartment is then used.

According to the modified arrangement shown in Figs. 4 and 5, the aforesaid sliding gate is dispensed with and a valve or cock $n$ arranged in the partition $b$ this valve or cock being opened or closed by the turning of a rod $o$ provided at its upper extremity with a crank, handle or the like $p$. This rod $o$ passes through an internally screw-threaded boss $q$ mounted in the top of the tea-pot and the said rod carries an enlarged screw-threaded part $r$ screwing into the said boss $q$ so that any pressure brought to bear upon the said rod in operating the valve or cock is borne by the boss $q$ instead of the valve or cock itself.

Having now particularly described my invention, what I claim as new and desire to secure by Letters Patent is:—

1. A tea-pot provided with a single handle at one end and a single pouring-spout at its other end, said tea-pot having also a partition across its middle part between the said handle and spout, and means for opening a passageway formed through the said partition.

2. A teapot divided by a diagonal partition into two compartments having a communicating opening formed in the said partition normally closed by means of a sliding gate, a rod in connection therewith, a spring arranged around the said rod normally tending to raise the said rod and gate and a sliding catch for retaining them in the closed position; substantially as described and shown and for the purposes specified.

In testimony whereof I affix my signature, in presence of two witnesses.

CHARLES GEORGE SLOPE.

Witnesses:
GODFREY B. SHEPHERD,
SYDNEY R. TAYLOR.